(12) United States Patent
Beauchesne et al.

(10) Patent No.: US 11,330,005 B2
(45) Date of Patent: May 10, 2022

(54) PRIVILEGED ACCOUNT BREACH DETECTIONS BASED ON BEHAVIORAL ACCESS PATTERNS

(71) Applicant: Vectra Networks, Inc., San Jose, CA (US)

(72) Inventors: Nicolas Beauchesne, Miami Beach, FL (US); Himanshu Mhatre, Mountain View, CA (US); Daniel Carlton Hannah, Melrose, MA (US)

(73) Assignee: Vectra AI, Inc., San Jose, CA (US)

( * ) Notice: Subject to any disclaimer, the term of this patent is extended or adjusted under 35 U.S.C. 154(b) by 192 days.

(21) Appl. No.: 16/384,807

(22) Filed: Apr. 15, 2019

(65) Prior Publication Data

US 2020/0329062 A1 Oct. 15, 2020

(51) Int. Cl.
*H04L 29/06* (2006.01)

(52) U.S. Cl.
CPC ........ *H04L 63/1425* (2013.01); *H04L 63/102* (2013.01); *H04L 63/105* (2013.01); *H04L 63/1433* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 9,166,993 B1 * | 10/2015 | Liu | H04L 63/1425 |
| 9,407,652 B1 * | 8/2016 | Kesin | G06N 7/005 |
| 9,600,656 B1 | 3/2017 | Wellinghoff | |
| 10,482,268 B1 * | 11/2019 | Osborne | G06F 21/55 |
| 10,742,677 B1 * | 8/2020 | Wu | H04L 63/1408 |
| 10,812,934 B2 * | 10/2020 | Rothschild | H04W 4/029 |
| 2008/0288330 A1 | 11/2008 | Hildebrand et al. | |
| 2012/0137367 A1 * | 5/2012 | Dupont | G06F 21/00 726/25 |
| 2014/0165198 A1 | 6/2014 | Altman | |
| 2014/0325643 A1 * | 10/2014 | Bart | H04L 63/1425 726/22 |
| 2015/0012751 A1 | 1/2015 | Forster et al. | |
| 2018/0115578 A1 * | 4/2018 | Subbarayan | H04L 63/1425 |
| 2019/0028357 A1 * | 1/2019 | Kokkula | H04L 41/0813 |
| 2019/0109868 A1 | 4/2019 | Muddu et al. | |
| 2019/0132224 A1 * | 5/2019 | Verma | H04L 47/2441 |
| 2019/0141079 A1 * | 5/2019 | Vidas | H04L 63/20 |
| 2019/0166144 A1 * | 5/2019 | Mirsky | H04W 12/1204 |

(Continued)

FOREIGN PATENT DOCUMENTS

EP 3221793 B1 10/2018

OTHER PUBLICATIONS

European Search Report dated Aug. 28, 2020 for EP Application No. 20169673.9.

*Primary Examiner* — Michael Pyzocha
(74) *Attorney, Agent, or Firm* — Vista IP Law Group, LLP

(57) ABSTRACT

Disclosed is an improved approach for detecting potentially malicious activity on a network. The present improved approach generates a multi-dimensional activity model based on captured network activity. Additional network activity is captured, and relative activity values are determined therefor. Determination of whether the additional network activity corresponds to potentially malicious activity is obtained by fitting the relative activity values of the additional network activity to the multi-dimensional relative activity model.

20 Claims, 9 Drawing Sheets

(56) References Cited

U.S. PATENT DOCUMENTS

2019/0230088 A1\* 7/2019 Rice .................... G06F 21/6218
2019/0319987 A1\* 10/2019 Levy ................... H04L 63/0838
2020/0026397 A1\* 1/2020 Wohlstadter .......... G06F 3/0482
2020/0285737 A1\* 9/2020 Kraus ................. H04L 63/1425

\* cited by examiner

PRIVILEGED ACCOUNT BREACH DETECTIONS BASED ON BEHAVIORAL ACCESS PATTERNS

BACKGROUND

In recent years, the difficulty of detect threats on enterprise networks without causing costly disruption has been increasing. Various types of security products have been deployed to increase the security of enterprise networks. Generally, these products come in two forms. A first form comprising security products that have sets of rules or guidelines that cannot be modified without creating exposure to unknown risks, and a second form that leverages machine learning to identify anomalies.

However, the first form requires that every modification or customization to security rules undergo strict and thorough testing to ensure the proposed change is secure and that it will not inadvertently block a mission-critical application before it is implemented in live enterprise networks. While this thorough testing process may increase safety, it drastically reduces the speed and capability of networks to quickly adapt to new threats. Furthermore, many companies do not have the capability, time, or resources to continuously update their network security products in a way that is both safe and compatible with their networks. As such, the only option for many companies is to simply adopt a well-known security product and wait for new trusted updates to hopefully appear in time before new threats wreak havoc on company networks.

Additionally, the second form is generally not able to cope with highly dynamic environments in which they are deployed. For instance, simply mapping feature data to a multi-dimensional space may result in a machine learning system that is always trying to catch up, but which cannot adapt quickly enough to identify a reasonable amount of behavior as anomalous. In essence, people do unadvisable things often, and organizations have existing employees leaving and new employees starting on a regular basis. This creates a very dynamic environment that can be difficult to characterize with machine learning.

Nonetheless, identification of threats based on network traffic remains a critical goal of any network security appliance. A threat in the context of this document is defined by unauthorized access by a user of a restricted resource. While the computer or machine in question may be typically accessed for more common purposes, the restricted resource may be a host or service that allows for specific uses such as administration of a machine. A user may or may not be an employee or contractor of the company responsible for this resource. The user may gain access to this resource through stolen credentials, malware, or other means. Often, the restricted resources of interest are accessed via specific protocols usually used for administration.

One way in which users gain access to resources is through account authentication and authorization processes. Account authentication is one of the major foundations of computer security, but it is plagued with issues including weak passwords, stolen keys, password reuse, and centralized access that once compromised breaks role separation principles. Current approaches try to stop attacks by implementing more burdensome procedures on the user. This creates even more issues since not all systems are able to implement those new standards and they rely on the user to comply or at least comply in spirit.

Another issue with authentication methods is that all accounts are treated equally, whereas attackers focus their efforts on only a small subset of high-value/high-privilege accounts/host/services.

As is evident, there is a need for an improved approach to identify/avoid potentially malicious activity on a network.

SUMMARY

In some embodiments, network token/authorization traffic (network activity) is modified to map it to a multi-dimensional space of relative activity values using a scoring system. In particular, the relative activity values can be generated by identifying a particular action or number of actions, and generating a scoring or other metric corresponding to dimensions of the multi-dimensional space as disclosed herein. These relative activity values are then used to fit additional network activity to the model(s) to determine if the activity corresponds to potentially malicious or otherwise undesirable activity. If the comparison reveals that the activity is abnormal in comparison to past activity as characterized by the model(s) the activity may be flagged as potentially malicious, abnormal, risky, or otherwise undesirable. Based on this determination one or more alerts may be generated that in some embodiments also indicates the type of activity based on one or more dynamically changing regions in the multi-dimensional space. In some embodiments, the models are generated using a training dataset, where the training data set corresponds to past network token/authorization traffic during an identified time window, a sliding time window, or over one or more historic periods.

Further details of aspects, objects, and advantages of some embodiments are described below in the detailed description, drawings, and claims. Both the foregoing general description and the following detailed description are exemplary and explanatory and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. These drawings depict only typical embodiments of the invention and are not therefore to be considered limiting of its scope, the invention will be described and explained with additional specificity and detail using the accompanying drawings.

DETAILED DESCRIPTION

Figure 1A:
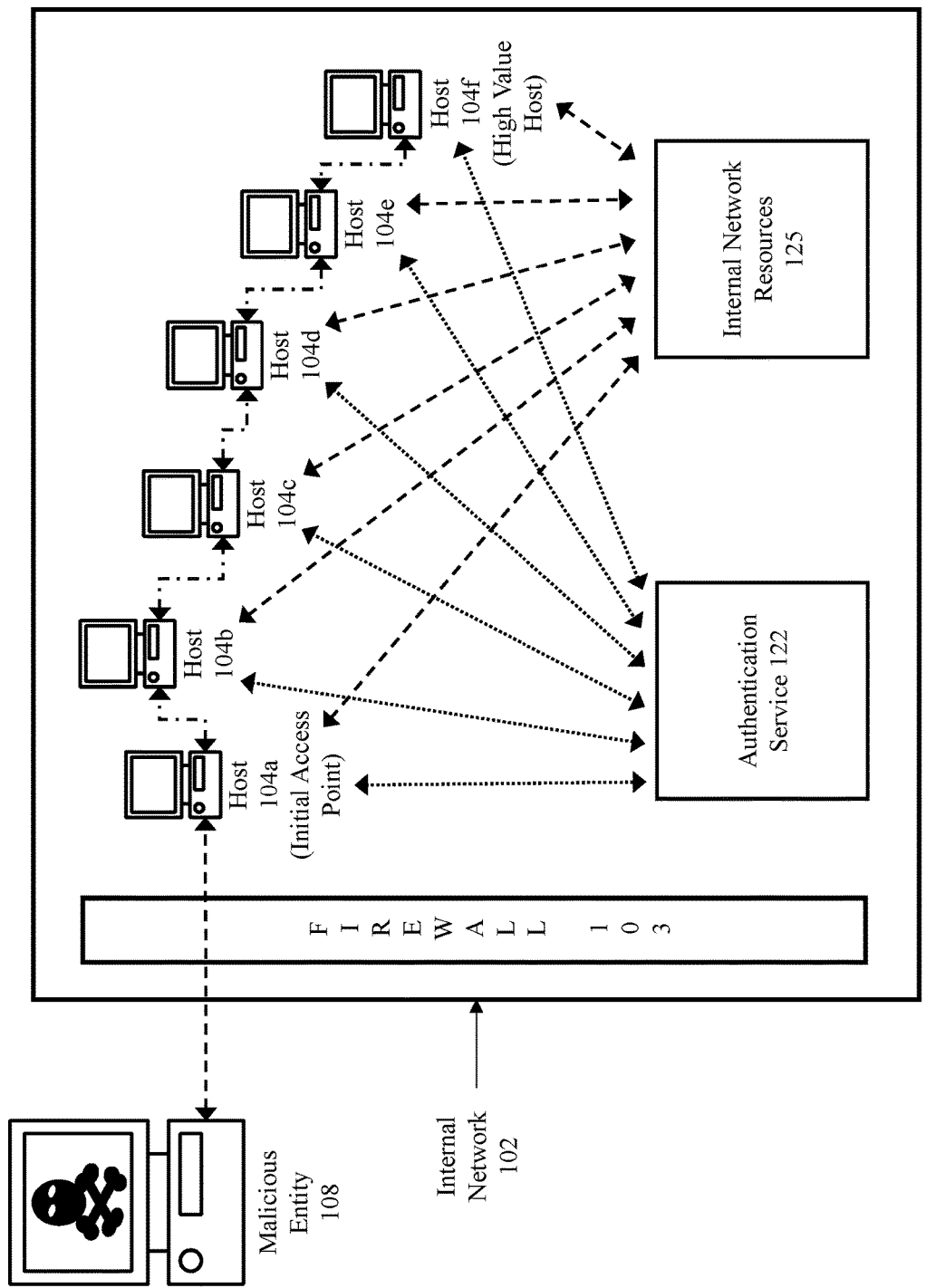
FIGS. 1A-1B illustrate an example environment(s) in which some embodiments of the invention are implemented.

Various embodiments of the invention are directed to a method for privileged account breach detections based on behavioral access patterns.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items.

In some embodiments, network token/authorization traffic is examined to learn the token/authorization behavior associated with accounts, hosts, and services of a network by a detection engine. This provides an effective way of determining whether or not network token/authorization traffic corresponds to potentially malicious, abnormal, risky, or otherwise undesirable activity. For instance, by fitting the representative values of the activity to a multi-dimensional relative activity model. If the comparison reveals that the activity is abnormal in comparison to past activity that abnormality is analyzed to determine whether to generate a corresponding alert and whether the activity can be categorized as a specific type of activity based on at least where the activity fall within a model.

In some embodiments, accesses can be filtered out from further scrutiny based on one or more thresholds corresponding to one or more functions or static values of account, service, and host privilege scores. For instance, for most companies each employee will have one or more email accounts. Theses emails accounts will likely be accessed daily. Thus, a large amount of network token/authorization traffic, if not a majority, may correspond to email access from relatively low value hosts and accounts.

In some embodiments, a detection engine, or a part thereof, is at or connected to one or more switches or hosts operating an authentication service for capturing network token/authorization traffic. The detection engine can capture the network traffic by processing the traffic in line or by performing a zero-load copy operation. Furthermore, in some embodiments, the detection engine processes authentication service logs. In some embodiment, the authentication service logs and the network token/authorization traffic are stitched together prior to processing.

In some embodiments, the network token/authorization traffic is used to generate a multi-dimensional relative activity model(s). For instance, network traffic is identified for analysis, and using data from the network activity a score or metric is calculated that rates, values, or ranks that activity in such a way that the network activity of the network is ranked relative to other network activity of the network and subsequently used to generate the relative activity model and to generate relative activity values (e.g. scores) associated with that activity. Furthermore, in some embodiments, the network activity itself is only used to determine the relative activity values and thus to generate relative activity model(s). In some embodiments, the dimensions of the model comprise any of an account privilege score, a host privilege score, and a service privilege score in a single multi-dimensional space.

In some embodiments, the models are generated using a training dataset, where the training data set corresponds to past network token/authorization traffic during an identified time window, a sliding time window, or over one or more historic periods. In some embodiments, previously identified network activity corresponding to potentially malicious, abnormal, risky, or otherwise undesirable activity is filtered/removed from the training data or marked as anomalous.

Figure 1B:
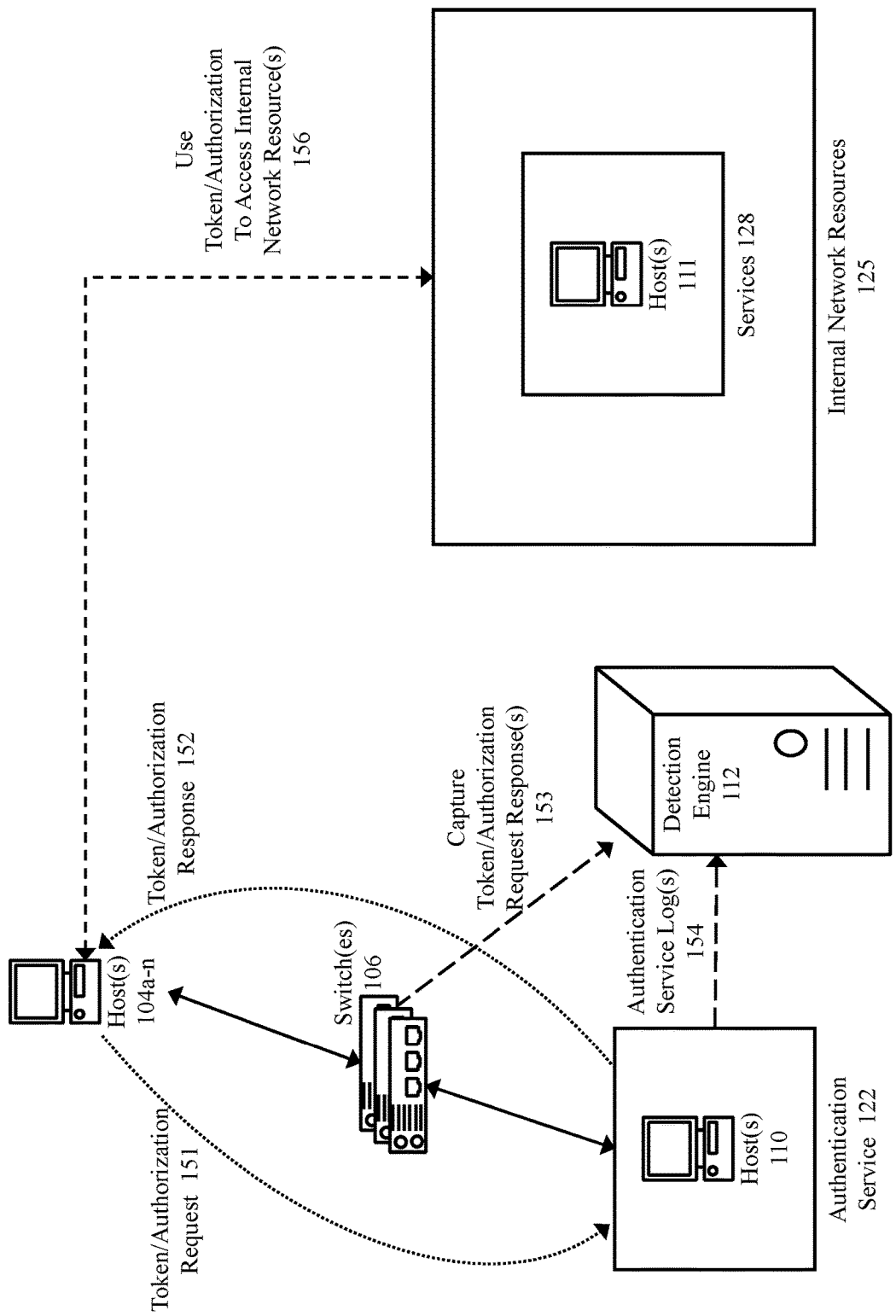

FIGS. 1A-1B illustrate an example environment(s) in which some embodiments of the invention are implemented.

FIG. 1A illustrates an environment in which an external malicious entity attempts to gain access to an internal resource through a high value host. In particular, the figure illustrates an external malicious entity that traverses a network, stealing credentials along the way, to gain access to a high value host with access to some desirable/desired internal network resource. However, in some embodiments, the approach illustrated herein is also applicable to non-malicious entities and to actions taken without malicious intent whether they initiate within or external to an internal network.

Generally, a malicious entity 108 attempts to gain access to an internal network 102 in order to access internal network resources (e.g. internal network resources 125). For instance, the malicious entity 108 may attempt to gain access to the internal network 102 through a firewall 103. Normally, malicious entities use any of several methods to gain access to a network. For example, a malicious entity can gain access by social methods (e.g. tricking, bribing, phishing, infiltrating, dumpster diving, physically stealing, etc.), brute force methods to identify (generally weak) passwords, physical access to a machine (e.g. a machine left unattended in a public area), or other technical methods that focuses on leveraging vulnerabilities at the software or hardware level (e.g. backdoors, buffer overflow attacks, email worm, root kits, session hijacking, and trojan horse programs). Regardless of the method used, the initial goal is to gain a foot print within the internal network that can be accessed by the malicious entity 108 external to the network. For instance, the malicious entity 108 gains access at a host 104a that is used to communicate through firewall 103.

Once an initial access point is established, the malicious entity 108 will attempt to gain access to other hosts within a network by traversing hosts within the network in the hope of reaching a high value host that has or is associated with credentials/authorization to access high value resources of internal network resources 125. For instance, the malicious entity may traverse hosts 104b-e in the network, stealing credentials along the way, until they ultimately reach a high value host 104f. High value host 104f may have access to internal engineering documents, confidential contracts, unreleased copyright material, etc. perceived as having a value to the malicious entity. It is these perceived valuable documents/data that the malicious entity is seeking.

Access to internal network resources 125 is managed by the authentication service 122. For example, each host 104a-f has a set of credentials that are used to request access tokens for services from the authentication service 122. The authentication service receives account credentials from hosts and returns authorization (usually in the form of tokens) to the hosts, which the hosts can use to access the internal network resources 125. Additional details of the access control system (e.g. the authentication service) is described in further detail in FIG. 1B.

In some embodiments, a malicious entity has direct access to an internal network and thus avoids the challenge of overcoming the protections of a firewall (see 103). For instance, a malicious entity (108) may comprise an employee undertaking a course of action adverse to their employer (operator/owner of the internal network)—e.g. corporate espionage, trade secret theft, accessing restricted materials, etc. In some embodiments, the malicious entity has no actual malice and instead is merely an individual engaging in abnormal, risky, reckless, or otherwise undesirable activity that may pose a risk to network resources. For example, an administrator using a publicly accessible kiosk (e.g. a machine used for signing in guests) to access/manage a sensitive internal network resource.

Furthermore, unless expressly limited by the language herein, potentially malicious activity also includes malicious activity as well as activity undertaken without actual malice such as abnormal, risky, or otherwise undesirable activity (e.g. sharing credentials), and may also originate from within or outside of the internal network and be initiated by a person in the employ of, or otherwise affiliated/contracted with, a corresponding employer or from a person who is not in the employ of, or otherwise affiliated/contracted with, the corresponding employer.

FIG. 1B illustrates aspects of an environment in which an entity (e.g. malicious entity 108 or affiliated individual) attempts to gain access to an internal resource through a high value host or to resources they should not be accessing either at all or in the specific manner in which they are accessing the resource(s). In particular, the figure illustrates a relationship between hosts, an authentication service, a detection engine, and internal network resources.

Internal network resources 125 comprise any number of resources accessed by hosts on a network. Furthermore, internal network resources may comprise both services and traditional resources. For instance, services include email services, Structure Query Language (SQL) based services, etc. hosted by one or more host(s) 111. Traditional resources comprise accessible databases such as databases that are accessible on a file by file basis—e.g. Common Internet File System (CIFS) or Server Message Block (SMB).

Access to the internal network resources 125 is managed by an authentication service 122. In some embodiments, the authentication service 122 is implemented by one or more host(s) 110. The authentication service 122 maintains or has access to a dataset for determining which host requests should be provided a positive response (e.g. a token or authorization) to allow access to a resource. In some embodiments, the active authentication service comprises a Microsoft "Active Directory" service or a Kerberos authentication/authorization protocol, though one of ordinary skill in the art would understand that other similar services could be implemented.

To briefly illustrate, the Kerberos authentication protocol generally works as follows. The Kerberos architecture usually contains the following systems: a client account operating from a client host, a service hosted on a service host, and a Kerberos Domain Controller (KDC) (see e.g. authentication service 122), which holds keys it shares with each client and service. The first step is for a client account (e.g. host 104a) to authenticate itself with a realm (which can be thought of as a namespace) managed by the KDC. Once authenticated, using the secret shared by the client account and the KDC, the KDC provides the client account with a session key and a ticket granting ticket (TGT). This session key can be used for a predefined length of time as a "passport" inside the network. The TGT is encrypted with the KDC master key and is later used by the KDC for service authorization. This encryption scheme allows for stateless distributed deployments of KDC infrastructure. When the client account needs to access a service/application/host, it sends the session key, the TGT, and an access request to the KDC for the service. The KDC can decrypt the TGT using its master key, thereby ensuring that the TGT is authentic. Having completed the authentication phase, the KDC can then perform the authorization phase, which determines whether the client is allowed to access a particular service. Once the request passes this check, it can construct and send a ticket granting service (TGS) reply to the client that is encrypted with both the client account session key and the service session key. Once the client account receives the TGS, it can start to communicate directly with the service/host. The client sends the part of the TGS that was encrypted by the KDC with session key to the service/host. Once the service/host has used its own session key with KDC to verify the validity of the TGS, it knows that KDC has approved the client account to access the service it provides, and then gives access to the service to client account.

Communications between the authentication service and the host(s) 104a-n are exchanged over one or more switches 106. Generally, these communications are initiated by the host(s) 104a-n. A host transmits a token/authorization request 151 to the authentication service over one or more switches 106. The authentication service 122 will process the token/authorization request 151 to determine whether a token or authorization should be provided to the host. Depending on the result of that determination, the authentication service 122 will return a denial or a token/authorization granting the requested access at 152. If the token is provided to the host, (e.g. a host of host(s) 104a-n) the host will use the token/authorization to access the internal network resource 125 at 156.

In some embodiments, the detection engine 112 includes a sensing module(s) for capturing token/authorization requests and/or responses at 153 from one or more of switches 106 or authentication service 122. For instance, the detection engine 112, includes multiple distributed sensing modules (taps) located at different locations (e.g. switch(es) 106 and/or authentication service 122 host(s) 110). The sensing modules can identify relevant information for use by the remainder of the detection engine 112—e.g. host corresponding to the request, requested service, corresponding protocol, whether the communication is a request or a response, whether the request was granted or denied, the time of the request/response, or any other relevant information. In some embodiments, the sensing module(s) are not part of the detection engine but are otherwise used to capture relevant information that is then provided for use by the detection engine 112.

In some embodiments, only requests or responses are captured at 153. In some embodiments, both requests and responses are captured. Furthermore, in some embodiments, the detection engine 112 processes authentication service logs, (see 154). Usually, most token/authorization requests will occur directly over the internal network and thus be capturable directly from network packets at one or more network devices (e.g. switches 106, or from host(s) 110 of authentication service 122). However, some requests will occur over encrypted connections (e.g. secure shell (SSH)) that can't be captured merely by observing packets at network devices. Instead, these encrypted connection authorization requests and responses are logged by the authentication service 122. Thus, the encrypted connection authorization requests and responses can be retrieved by parsing the authentication service log(s) at 154. In some embodiments, authentication service logs are aggregated at a log collector (not illustrated) prior to being provided to the detection engine 112. In some embodiments, the authentication service log(s) are compared to previously captured network activity to remove/exclude duplicate communications and thus avoid analyzing the same request and/or response twice. As will be discussed further below, in some embodiments, the logs and captured network activity can be stitched together in order to enrich the information available from only one of these sources.

In some embodiments, the detection engine 112 is provided on one or more host(s) 110 of the authentication service 122, on one or more separate hosts, on the switch(es) 106, or any combination thereof. The operation of the detection engine 112 is discussed further below at least in regard to FIGS. 2-5.

Figure 2:
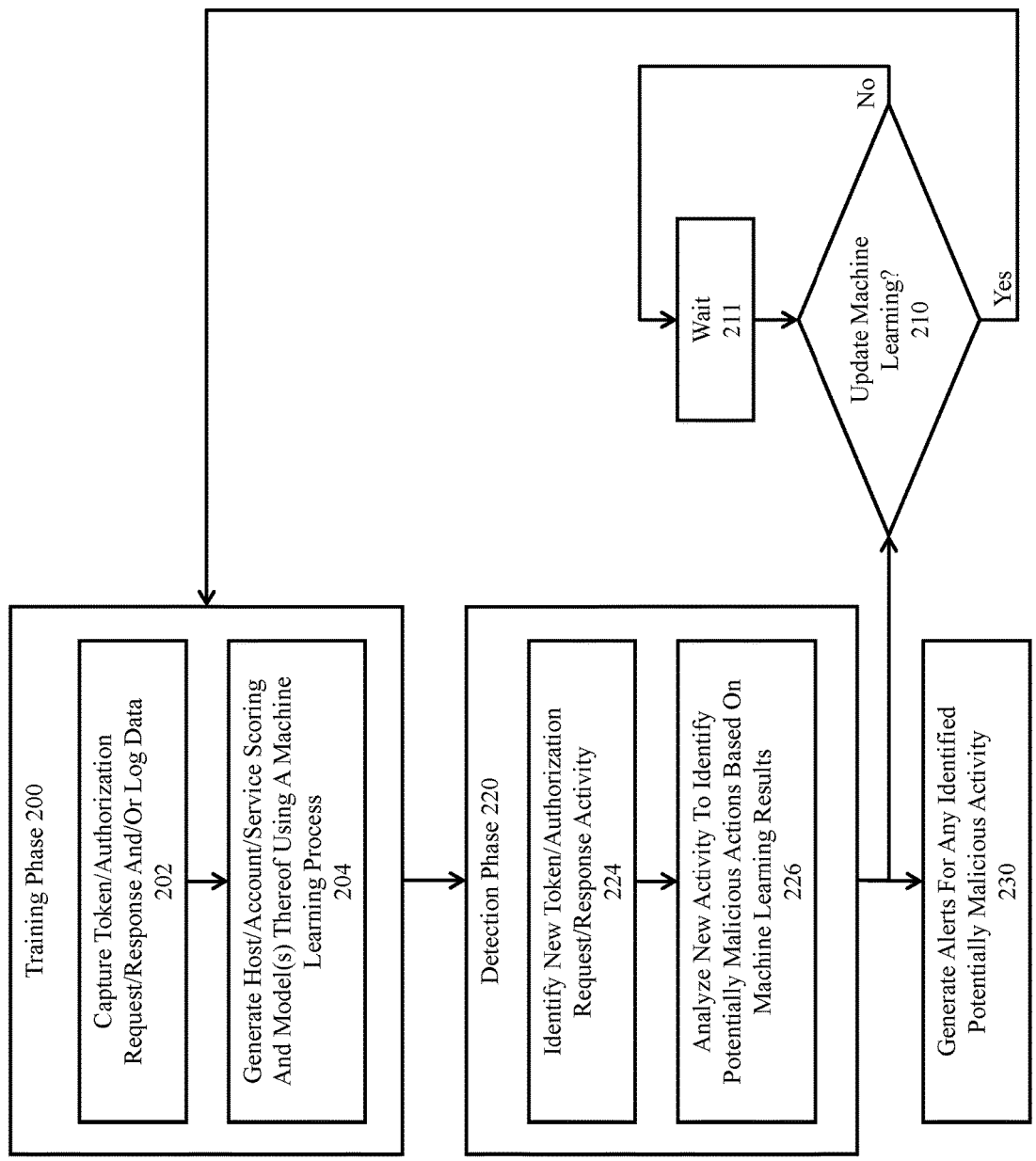
FIG. 2 illustrates a process flow according to some embodiments of the invention.

FIG. 2 illustrates a process flow according to some embodiments of the invention. Specifically, FIG. 2 illustrates a process flow implemented by the detection engine 112 discussed above, and in some embodiments, one or more sensing modules. Generally, the process includes capturing a set of token/authorization requests/responses or logs that provide the equivalent information, scoring the associated accounts, hosts, and services to implement a machine learning process to generate quantitative models that capture the relationships among relative scores of the account, hosts and service. Subsequently, the machine learning, represented by the model(s), is used to detect potentially malicious, abnormal, risky, or otherwise undesirable. Furthermore, the process includes control for updating the scoring and model(s) when a set of conditions are satisfied.

The process includes two main phases. The first phase comprises a training phase 200 where a set of token/authorization requests/responses are capture and represented by a dataset that is used to score aspects of those requests/responses and to use those aspects to generate a model(s) using a machine learning process. The second phase comprises a detection phase 220 where the results of the machine learning process (the model(s)) are used to compare characteristics representing newly captured token/authorization requests/responses to the model(s). In some embodiments, the training phase 200 may operate in parallel to the detection phase 220. For example, the training phase 200 may capture network activity, score that activity according to the relevant metrics, and use the machine learning process to generate a model representing that data. The detection phase 220, after a first model is generated, captures new network activity, matches relevant attribute values to the corresponding attributes generated in the training phase 200, and fits the relevant attribute values to the current model to determine if the activity is malicious. Meanwhile, the training phase also captures/analyzes the new network activity and uses the new network activity to update the machine learning as represented by the model(s) when one or more corresponding conditions are met. Thus, the training phase 200, can continue to operate by training and retraining while the detection phase 220 operates to detect potentially malicious activity. In some embodiments, the training phase 200 operates on aggregate sets of data, while the detection phase 220 operates on a data stream where each piece of newly received data triggers analysis of that data based on the then current machine learning.

At 202, token/authorization request/response and/or log data is captured. For instance, token/authorization request/response is captured using one or more sensing modules on switches such as switch(es) 106 discussed above in regard for FIG. 1B or log data is received from a domain controller or an intermediate log collector. The captured data can comprise any combination of request data, response data, or both. Furthermore, the data can be capture from network activity directly (e.g. by a packet copy operation) in real time, from log data (e.g. by parsing received activity logs), or both. When both direct network activity and log data is used to generate a training dataset, the log data is parsed to identify relevant information and also combined with other data in a process called "stitching" herein that will be discussed further below. In some embodiments, log data is further processed by comparing the log data to activity extracted from captured traffic to remove redundant entries.

At 204, relative privilege scores are calculated for individual hosts, accounts, and services and these scores are used by a machine learning process to generate a multi-dimensional model(s) based on a training dataset generated at 202. Generally, this includes a process for determining relative values as represented by privilege scores for hosts, accounts, and services associated with token/authorization requests/responses during a training period corresponding to the training dataset. These privilege scores indicate the operational privilege of an account, host or service. For instance, an everyday email account would likely have a low score indicating it is probably a low privilege account (independent of the actual privileges in a policy profile of the account), whereas one of only a few accounts that are authorized to access a particular file server would have a high score indicating that it is probably a high privilege account (independent of the actual privileges in a policy profile of the account). Using these privileged scores, the detection engine 112 uses a machine learning process to generate models that can be used to determine if a current access is malicious, where a malicious access corresponds to a lack of congruence in the privilege scores of the entities involved in the access.

In some embodiments, the training time period comprises a sliding time window, a periodic time window, a fixed time window, or a manually adjustable time window. For instance, a training window might comprise 30 time windows each comprising a 12-hour time period that corresponds to a default time period for which a ticket granting ticket is valid.

Furthermore, in some embodiments, previously identified network behavior that corresponds to malicious or potentially malicious behavior is excluded from the training data or identified as malicious or potentially malicious to ensure that boundaries are appropriately set to include or exclude the potentially malicious activity as normal/abnormal as appropriate. Further details of this process are discussed below at least in regard to FIG. 3A.

Regardless, of the overall and individual time windows, the relative values are input into a machine learning process to characterize the network token/authorization request/response activity. For instance, the network token/authorization request/response activity is received by a module that maps the activities in an n-dimensional space according to how the relative values are related in each dimension. The relative values are then processed using appropriate machine learning techniques, such as any one of number of possible centroid algorithms that calculates one or more centers of mass, a line of best fit, a path, or any other methods as would be understood by one skilled in the art.

At 224, additional token/authorization request/response and/or log data is captured. In some embodiments, only responses are capture or only requests are captured. In some embodiments, the token/authorization request/response is capture in real-time using a packet copy operation. In some embodiments, the token/authorization request/response is captured by parsing logs delivered to the detection engine. In some embodiments, token/authorization request/response data is captured from both a real-time packet copy operation and from logs. For instance, using FIG. 1B to illustrate, a host of host(s) 104*a-n* generates a request for a token/authorization via switch(es) 106. The authentication service 122 responds using a host of host(s) 110 which provide token/authorization responses as appropriate (e.g. grants requested access by providing a token/authorization (ticket granting ticket) or transmits a denial message). The detection engine 112, using a sensing module(s), captures either the request, the response, or both for fitting against a multi-dimensional model already generated by the machine learning process, where the capture is performed by a packet copy operation, or a packet processing and logging operations.

In some embodiments, the captured data can be maintained in a database for future use in training the machine learning process. Furthermore, the detection engine 112 might receive log data corresponding to token/authorization requests from the authentication service 122 or from a log collector. In some embodiments, only log data for encrypted communications is received. In other embodiments, log data for encrypted and unencrypted requests is received and subsequently processed to identify the requests/responses that were not already captured through another method (e.g. packet copy).

At 226 the information captured at 204 is processed to determine where the captured requests/responses are located on the multi-dimensional model(s) and thus whether the captured information corresponds to abnormal activity. This will be discussed further below at least in regard to FIGS. 3B and 4A-4B. However, briefly, the process comprises identifying the scores of the associated host/account/service and fitting the score to the model(s) generated by the machine learning process. For instance, the machine learning process determines whether the communication as represented by the scoring values falls within a region previously identified as normal, or whether it does not fall within a region previously identified as normal region.

If potentially malicious activity is identified at 226, then at 230 one or more alerts may be generated. For instance, alerts may be generated for display to an administrator (e.g. via a management interface or console, via email, text, instant message, or push notification). Additionally, alerts may be generated to other security systems and to log additional data, such as to an intrusion detection system that tracks potentially malicious activity and identifies a chain of breaches in order to increase the confidence given to a particular alert that said alert is a genuine intrusion. In some embodiments, the potentially malicious activity comprises any of malicious activity or activity undertaken without actual malice such as abnormal, risky, or otherwise undesirable activity (e.g. sharing credentials), and may also originate from within or outside of the internal network and be initiated by a person in the employ of, or otherwise affiliated/contracted with, a corresponding employer or from a person who is not in the employ of, or otherwise affiliated/contracted with, the corresponding employer. In some embodiments, the whether the alert is generated, and the contents/type of the alert depends on the type of activity identified based on one or more dynamically defined regions within a model(s).

At 210, a determination is made as to whether the previously generated models should be updated to account for more recently captured data—e.g. the recent processed token/authorization request/response activity. In some embodiments, the models will be updated periodically, after a number of requests and/or responses are captured, or after a number of potentially malicious requests and/or responses are captured. If, at 210, the process determines that it is not time to update the model(s), then the process will loop until a determination is made to update the models possibly subject to a delay (see wait 211). In some embodiments, an update can occur in response to receipt of an input corresponding to a user (e.g. an administrator providing an input via a user interface). In some embodiments, the determination is gated by a timer or other element to control the usage of the determination step (see e.g. wait 211). For instance, a counter that counts time or a number of captures used to determine or control the timing of the determination. If it is determined that the model(s) should be updated, then the process will initiate the training phase 200 where host/account/service privilege scores are updated/generated and a model(s) thereof using the machine learning process.

Figure 3A:
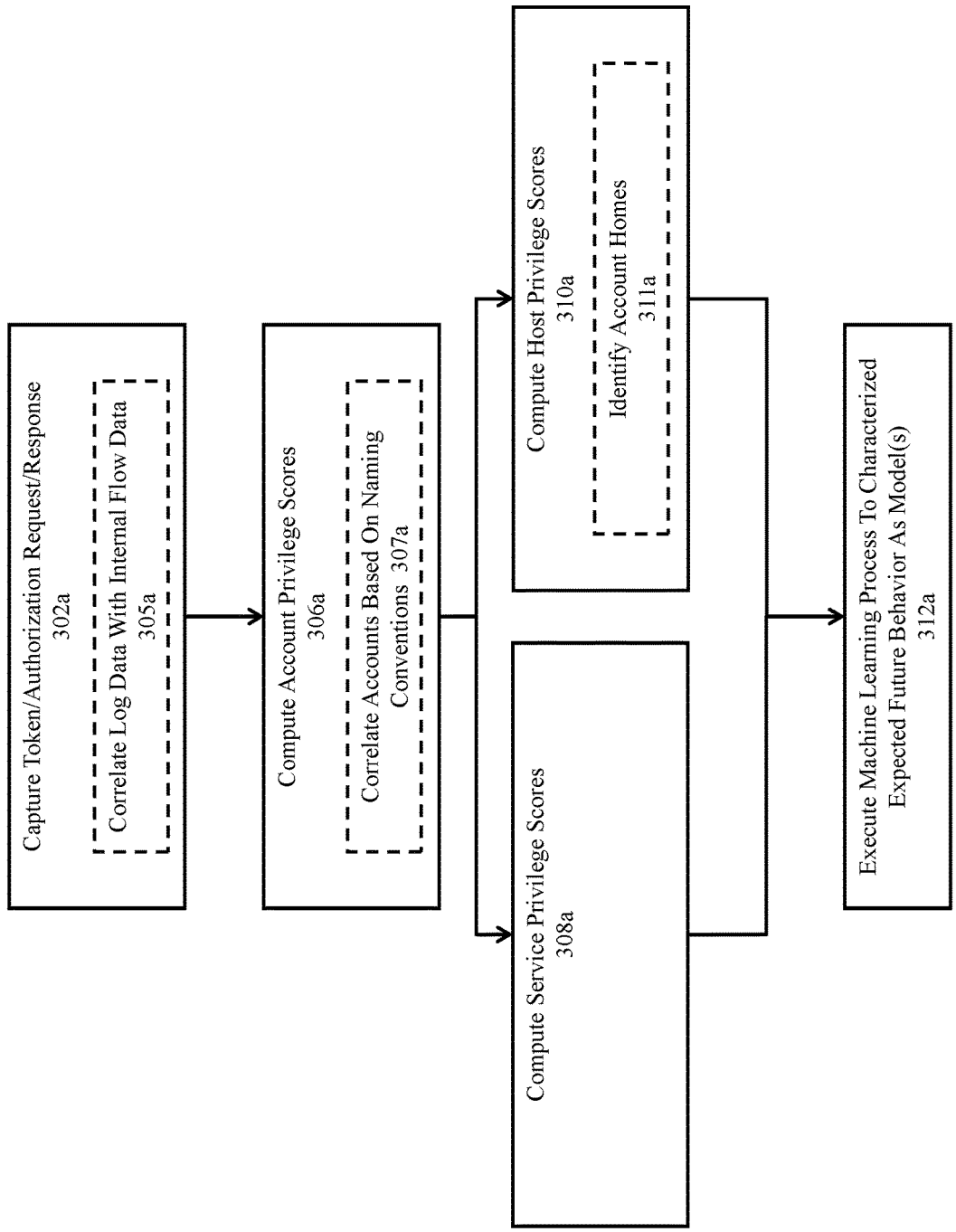
FIG. 3A illustrates an expanded view of the training phase shown in FIG. 2 according to some embodiments of the invention.

FIG. 3A illustrates an expanded view of the training phase shown in FIG. 2 according to some embodiments of the invention.

The process starts at 302*a* where token/authorization request/responses are captured. In some embodiments, the token/authorization requests and/or responses are captured using a packet capture process such as a zero-copy operation or an in-line processing operation to identify relevant information (e.g. host requesting, account requested/used, and service identified, protocol requested, time of request, etc.). In some embodiments, one or more authentication service logs are used to supplement or replace the token/authorization requests and/or responses captured from switch(es) 106 or host(s) 110. In some embodiments, only requests are captured, such as when an administrator wants to be notified of attempts to access resources that might correspond to potentially malicious activity. In some embodiments, only responses are captured, such as when an administrator wants to be notified of authorizations or tokens provided to allow access to resources that might correspond to malicious behavior. Regardless of whether requests or responses are captured, both can be modeled and applied as discussed herein. However, for the sake simplicity, we will discuss only token/authorization responses here, unless otherwise indicated.

In some embodiments, log data from the authentication service can be correlated with internal flow data at 305*a* by stitching two sets of data together. For instance, internal flow data for which account information could not be identified or which was identified as an encrypted payload (e.g. SSH), at 302*a*, can have account information provided from a corresponding log record. This log data can be used to associate the encrypted payload/unidentified flow data to a given account and service by correlating known information (timing and/or size of communications) to timing information stored in a corresponding log record.

Generally, Kerberos provides information that can be used to identify the host, account, and service all in one token/authorization response. However, not all methods to authenticate accounts to access services provide this information in one place. In some embodiments, log data from the authentication service or from another location can be correlated with captured network flow data—e.g. when a service acts as an intermediary to an authentication system and obscures the original source of the request (i.e. LDAP and cloud services). For instance, one particular type of authentication service protocol is the lightweight directory access protocol (LDAP) which does not provide all three elements (host, account, service) of the information in one place. Instead, when a user connects to a service, the server hosting the service delegates the authentication and authorization process to the authentication (e.g. LDAP) server. Since the server perform the authentication on behalf of the user, the server appears to be the client from the point of view of the log. Using stitching we can identify corresponding communications from/to a host to a service and from the host hosting the service and a LDAP service by comparing the timing of communications between the host and the service and between the service and the LDAP service. Similarly, cloud services generally use a key and resource system but also fail to provide identifying information for a host—e.g. cloud services normally only know an organizations public IP address but not a host's private IP address from inside the network. Yet, a corresponding host for a cloud services access can likewise be identified by comparing the timing and/or size of communications between the host and a gateway device and between the gateway device and the cloud service. Thus, by analyzing the log data, all three elements (host, account, service) involved in the token/authorization request/response data can be identified.

At 306a, account privilege scores are computed. In some embodiments, each account is associated with a privilege score. For instance, a particular machine could be associated with a particular account. This account may be utilized to access multiple services (e.g. email, file server, print server, etc.). Each of those services might be associated with one or more different protocols—e.g. the email service is associated with post office protocol (POP), simple mail transfer protocol (SMTP), Exchange, and internet message access protocol (IMAP) which together comprise a single service. Additionally, the host(s) that operate the email service might be managed via a remote procedure call (RPC) service. Each unique combination of an account, a service and server pair, and the host from which the access is requested may be represented by a unique tuple, where each unique tuple has a calculable account privilege score portion. The sum of these account privilege score portions for a single account together comprise the account privilege score. The account privilege score portion for each unique combination (e.g. unique tuple) is 1 divided by the number of other accounts that are observed using the same service and server combination observed over the training period.

For example, if we assume for simplicity that all accounts are utilized during a corresponding training window and the token/authorization requests/responses are captured at 302a, then in an organization that has 10,000 employees, each with an email account that authorizes them to use Exchange (protocol) for an email (service) of an account, each of those accounts would have a score of $1/10,000$ (0.0001). However, if five of those employees are administrators with RPC access to manage the email service, then those five employees would have account privilege scores of $1/5+1/10,000$ (0.2001). Thus, the administrator accounts would have a much higher privilege score.

In some embodiments, the number of account, service/server, and host combinations are generated only from the captured token/authorization request and/or response data. Thus, only account, service/server, and host combinations that were actually requested or provided during a training period are relevant in determining scores. This avoids counting stale and unused accounts when trying to determine operational privileges of a resource. For instance, this avoids counting the accounts for employees that are not currently active (e.g. employees on leave, vacation, or no longer with the company), and thus avoids diluting the scores of those that are actually active working for, or on behalf of, an organization. If only 7,500 of 10,000 employees utilized their email accounts during the corresponding time (e.g. only 7,500 employees accounts where accessed for sending, receiving, or syncing accounts), then each account would have a score of $1/7500$ (~0.00013333). Similarly, if only two of the five administrators with RPC access utilized their RPC accounts to access the RPC service, then each of the RPC accounts would have a score of $1/2+1/7500$ (~0.50013333).

In some embodiments, at 307a, accounts with privileged access to resources that have low privilege score (cause they are never used to access privileged resources) can be identified based on a correlation with other accounts, that have been seen to access privileged resources—thereby having a high privilege score, that use a similar naming convention. Accounts thus identified can be treated as a high value account with a low privilege score. For instance, multiple accounts ending in "_admin" are identified where the majority of those accounts have a relatively high account privilege score (e.g. one or more orders of magnitude larger than other accounts not ending in "_admin"), a subsequently identified account having the same suffix but a relatively low account privilege score may nonetheless be identified as a high value account despite a low computed account privilege score. One possible method to identify naming conventions can be performed using N-gram model trained using a maximum likelihood estimation to deduce the meaning of prefixes, suffixes or characters at certain positions in the name for administrative/management accounts or other high scored accounts. Generally, this identification technique can leverage internal naming conventions within organizations to identify important accounts that should be given additional scrutiny. Other naming conventions could be identified from various clauses such ones corresponding to positions of authority or privilege (chief technical officer (CTO), chief financial officer (CFO), chief executive officer (CEO), vice president, director, etc.), or from particularly sensitive departments, such as human resources. In some embodiments, if an account is identified as a high value account in this manner then its score can be increased to a minimum value, multiplied by some selected number, increased by some selected number, or modified in a manner to correlate its account privilege score with one or more of the account privilege scores of other accounts similarly identified (e.g. increased to the highest account privilege score, the average account privilege score, or the median account privilege score of the accounts following the same naming convention).

At 308a, the service privilege score is computed. In some embodiments, the service privilege score comprises the median of an ordered list of values, where the list is ordered in an increasing or decreasing order. The values within the list are generated based on the number of times a respective account utilized the service multiplied times the account privilege score of the account. For instance, for each account that was used to access the service in a given time frame a value is added to the list comprising the number of times the account was used to access the service times the account privilege score for that account. Subsequently, we select the median value in the ordered lists as the service privilege score. For example, an email service privilege score is based on the account privilege scores of the accounts that received TGS tokens for that email service multiplied by the number of times within each of a plurality of 12-hour time windows those TGS tokens were granted. However, in one embodiment, the service privilege score is the weighted mean of the account privilege scores of accounts that access that service weighted by the number of time windows during which corresponding TGS tokens were issued for each account. For example, over a given set of time periods (e.g. the last 28 12-hour periods) each account may or may not have been associated with a TGS token (e.g. may or may not have been used). However, the regularity of use may be one factor related to the relative score that should be assigned to the service. Thus, the service score might be proportional (either directly or inversely) to the number of time windows in which that service is used. Therefore, one way in which to compute the service privilege score might be to take an average of weighted account scores, where the weight of each account score is determined based on the number of time windows the account received a TGS token over the corresponding time periods (e.g. if TGS tokens were received in 14 out of 28 time periods the weight for the account score might correspond to 14/28=0.5, 28/14=2). Furthermore, in some embodiments, the weighted account scores might be averaged and then divided by the number of time periods over which the weighted account scores were computed.

In another embodiment, the service privilege score is the mode corresponding to the account that access the service most based on the number of time windows during which TGS tokens were issued.

At 310a, the host privilege scores can be determined in a manner similar to the service privilege scores. Specifically, the host privilege score comprises a mean of a list of host/account privilege score components for a respective host. Each host/account privilege score component for a respective host comprises, for each account, the non-zero number of time windows in which the account was used on the host times the account privilege score of that particular account. In some embodiments, the service privilege scores and the host privilege scores are computed in parallel. Here as with the service privilege scores, the host privilege scores are computed using at least the account privilege scores. However, instead of using the account privilege scores of all accounts that access a service, here we are concerned with the account privilege scores of accounts on the host. Thus, a host (e.g. a laptop, desktop, mobile device) might be associated with one or more accounts. For instance, an administrator would generally have an unprivileged account or set of accounts for using low privileged services (e.g. email, issue ticketing system, laptop backup, file server, printers, etc.) and a second privileged account or set of accounts for administrative tasks (e.g. email RPC access, corporate backup account, file server account management access, printer access management, an authentication service management account, etc.). By identifying the accounts associated with the host (e.g. accounts that are associated with a request/response for a token/authorization to access from/to the host), a host privilege score can be generated. For instance, in some embodiments, a host privilege score could comprise a sum, mean, median, or mode of account privilege scores of accounts used on the host. For example, a particular host might be associated with 5 accounts having different account scores. For instance, if the accounts have the scores of {3, 7, 28, 28, 67}, then the sum is 133, the mean is 26.6, the median is 28, and the mode is 28. Any of which could be used for the account privilege score for the particular account.

In some embodiments, accounts will be used on multiple devices. For instance, while most accounts will typically operate out of a single host (e.g. laptop/desktop computer) administrators might have accounts that they use on multiple devices. For instance, an administrator may log into management services from a host being configured for an employee. This may occur on multiple occasions to do an initial configuration and to verify/correct the operation of a user's device in association with that service. However, the administrator may also have a device assigned to that administrator or one that the administrator normally uses for day to day activities that should be considered their home device from which they perform most of their activities or at least more of their activities than on other hosts. Thus, in some embodiments, at 311a account homes can be identified for accounts such as administrator accounts that are utilized from multiple hosts. For instance, by monitoring the distributions of activities related to account token/authorization requests and the hosts associated with those activities, it is often possible to identify the home host for an account—e.g. as the one associated with most of the use of those accounts. In some embodiments, when an account is used on a host, but that account is identified as having a home that is on a different host (e.g. an administrator logging into their own account from another's machine) the account is exclude when determining the host privilege score for that host because that account is not at home on that host. This avoids artificially inflating the score of a host when an account that does not belong to that host is used on the host.

At 312a, a machine learning process is executed to create model(s) of expected behavior. This process is discussed further in regard to FIGS. 4A-4B below. However, we briefly discuss one embodiment here. For example, the process comprises first mapping the account, host, and service privilege scores, based on past activity for a corresponding time window, to a multi-dimensional space. This provides a relative mapping of the observed activity (network token/authorization request/response activity) to a multi-dimensional space. Subsequently, the relative mappings of the observed past activity can be processed to identify one or more centroids, to identify an exclusion region, or to identify different areas in the multi-dimensional space that correspond to different access patterns that are normal or abnormal. In some embodiments, one or more regions are defined by areas not associated with normal activity, wherein the one or more regions dynamically shift with the training data used to generate the model. In some embodiments, thresholds are statistically determined thresholds or threshold functions (e.g. as a multiple of standard deviations) corresponding to one or more lines or paths of best fit to the normal data. Furthermore, as one of ordinary skill would understand the multi-dimensional space can be expanded to include other relative scores.

Figure 3B:
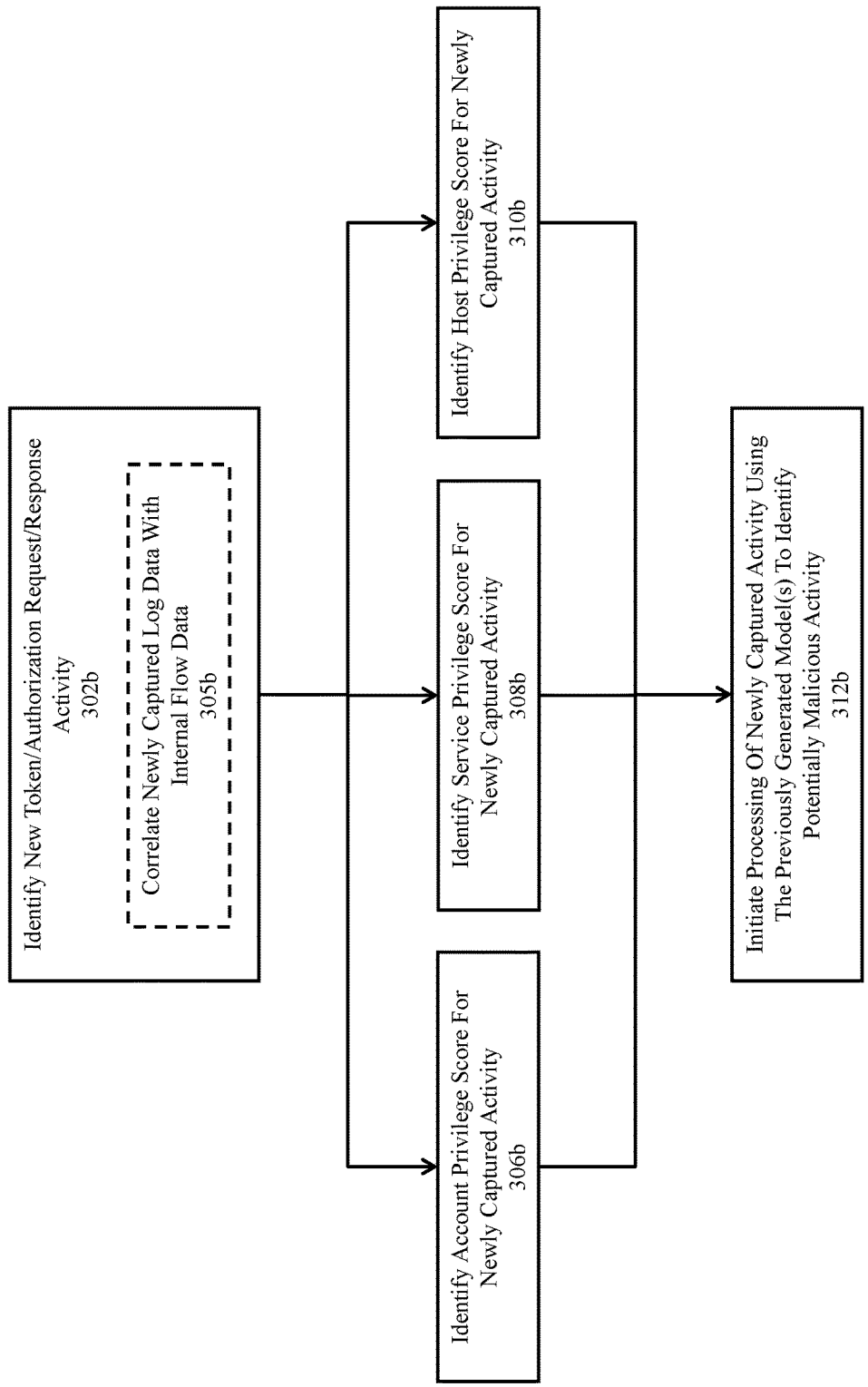
FIG. 3B illustrates an expanded view of the detection phase shown in FIG. 2 according to some embodiments of the invention.

FIG. 3B illustrates an expanded view of the detection phase shown in FIG. 2 according to some embodiments of the invention. The process is similar to that of FIG. 3A in that data is captured, account privilege scores, service privilege scores, and host privilege scores are determined. However, the process differs in that the scores are retrieved from the dataset generated in the training phase 200, and that the scores are then applied to the generated model(s) to determine whether the activity is normal or potentially malicious activity.

The process starts at 302b, where new token/authorization request/response data is captured as discussed in regard to 202, 302a, and 305a above. For instance, each request and/or response may trigger the flow illustrated in FIG. 3B to implement a stream processing flow. Alternatively, requests and/or responses may be bundled prior to processing as a group, such as based on a target group size (e.g. 100 requests and/or responses), a minimum or maximum time, or based on some other rule. Furthermore, in some embodiments, the newly captured data is also correlated to newly captured log data to identify any missing or otherwise incomplete requests at 305b as discussed above in regard to 305a.

Subsequently, each newly captured token/authorization request and/or response is processed to retrieve an account privilege score at 306b, service privilege score at 308b, and host privilege score at 310b—e.g. by identifying the relevant information (host, account, and service) and performing a lookup operation on the captured token/authorization request/response and/or log data from 202 used to execute the machine learning process at 204. For instance, the account privilege score, at 306b, can be retrieved by matching the account to a previously generated account privilege score computed as discussed above in regard to 306a (and optionally 307a), the service privilege score, at 308b, can be retrieved by matching the service to a corresponding service privilege score computed as discussed above in regard to 308a, and the host privilege score, at 310b, can be retrieved by matching the host to a corresponding host privilege score computed as discussed above in regard to 310a.

In some embodiments, newly captured token/authorization request and/or response activity might not have one or all of the corresponding scores (account, service, and host scores). In some embodiments, activity with one or more missing scores are not processed for identification of potentially malicious activity. In some embodiments, an account, host, and/or service not having a corresponding previously determined score is given a default value comprising zero, a maximum value, a minimum value, an average value, a median value, or a mode value for the corresponding attribute.

At 312b, processing is initiated for the newly captured data using the previously generated model(s) to identify potentially malicious activity. This will be discussed more in the context of FIGS. 4A-4B. However, we briefly discuss here. In one embodiment, scores associated with the newly captured requests and responses are used to fit the activity to the model(s) and determine whether the activity corresponds to potentially malicious activity based on where the activity falls within the model(s). In some embodiments, one or more thresholds associated with the model(s) are used to determine whether the activity should be ignored or excluded from further processing. Generally, if the behavior falls outside of the threshold region the behavior is determined to be potentially malicious.

Figure 4A:
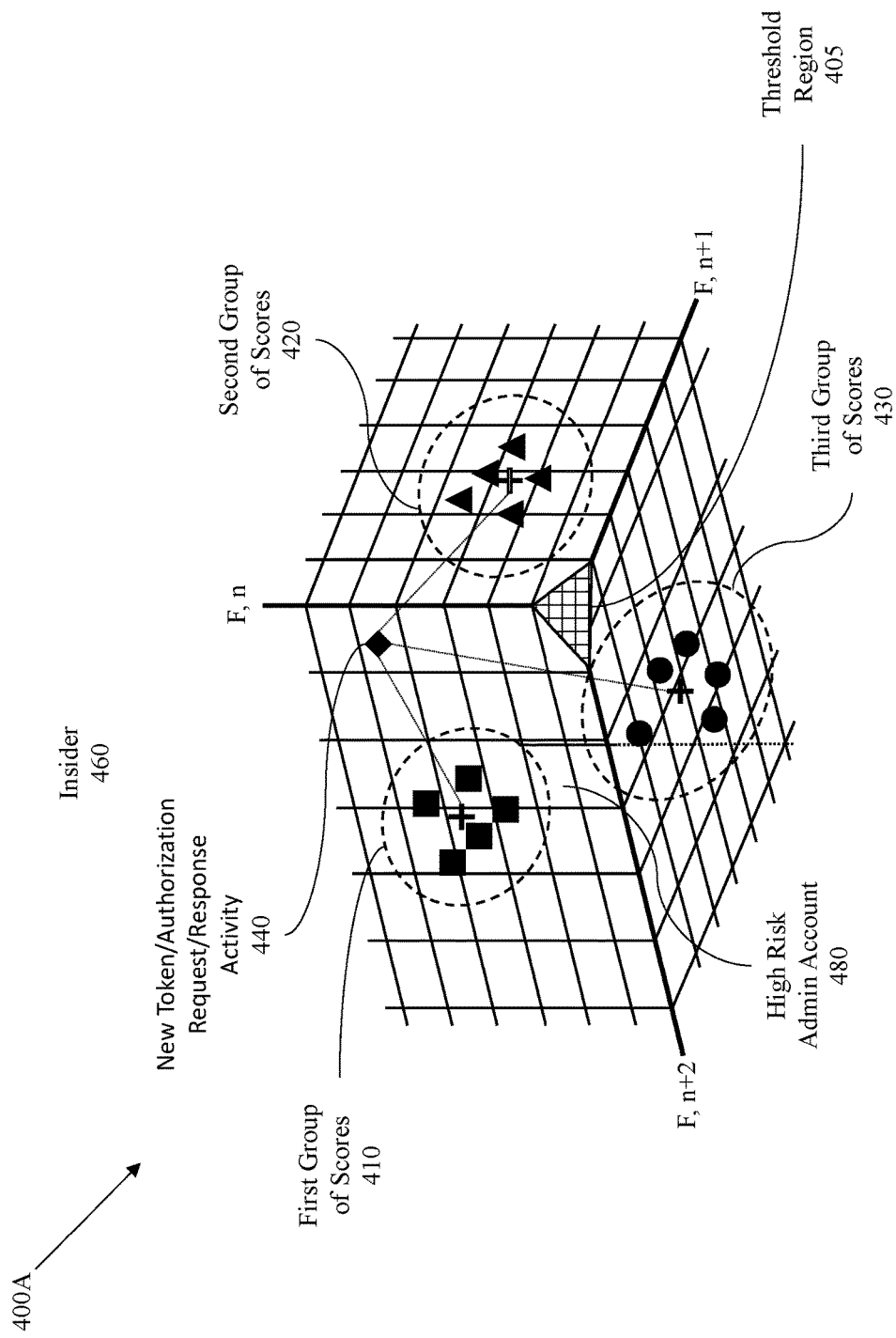
FIG. 4A-4B provide graphical illustrations of the relationships between account, host, and service privilege scores.
Figure 4B:
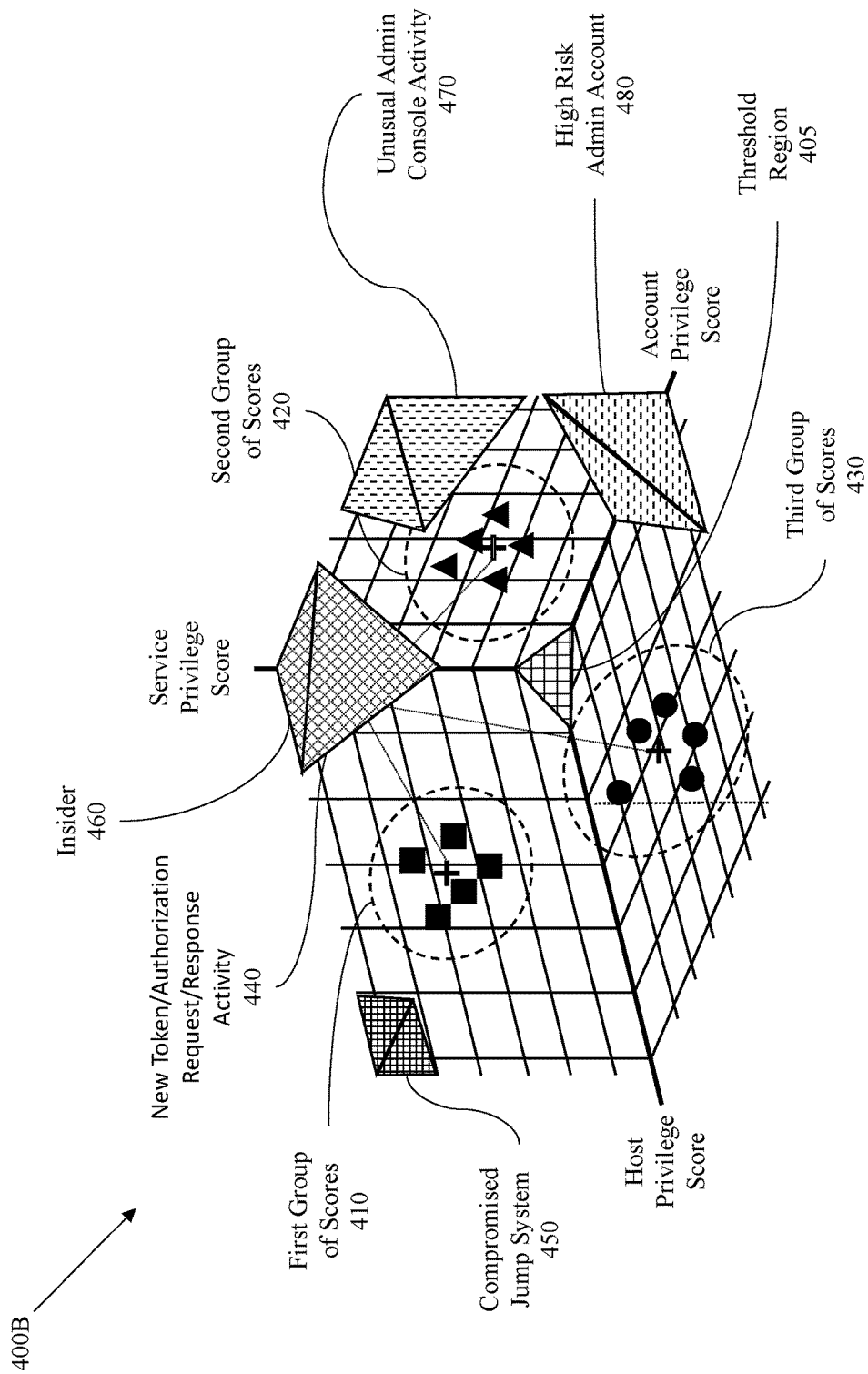

FIGS. 4A-4B provide graphical illustrations of the relationships between account, host, and service privilege scores. Using these relationships newly captured data can be processed to identify what region that data falls within in the multi-dimensional space. Furthermore, in some embodiments, regions of the three-dimensional space can be identified that correspond to different types of potentially malicious activity.

FIG. 4A provides a graphical illustration of an example multi-dimensional graph having at least the dimensions of Fn through Fn+2.

Specifically, the illustration 400A shows three axes, Fn, Fn+1, and Fn+2 defining an example three-dimensional space. Within this space a data triple is mapped corresponding to the three dimensions. For instance, a first group of scores are illustrate at 410 where the square symbols represent a particular instance of network token/authorization request/response activity in a relative manner. Likewise, a second grouping 420 is illustrated (see triangle symbols), and a third grouping 430 (see circle symbols). Each of these grouping might be processed using any number of algorithms to define a region. Here, the illustration shows identified centers of mass as represented by the "+" symbol within each grouping. However, other techniques could be used to generate centroid points or to generate a path through the multi-dimensional space from which one or more threshold differences are determined and from which normal and abnormal behavior can be identified.

At 440, a new token/authorization request/response activity is illustrated. For instance, the new token/authorization request/response activity corresponds to a new TGT or TGS response captured from the authentication service 122 and mapped to the relative values of the multi-dimensional space as previously discussed. Once the activity is mapped to the multi-dimensional space, one or more distances from one or more groupings or paths through the dimensional space can be identified. Based on these one or more distances, a determination can be made as to whether the activity is abnormal or not as determined by whether it falls within, or does not fall within, any of the regions defined by the threshold(s). For example, here we illustrate the activity at 440 having 3 distances each from the illustrated centers of gravity of the groups 410, 420, and 430 and thus not falling within any of the previously defined regions of normal activity.

Additionally, a threshold region 405 might be defined by one or more parameter ranges/values of the multi-dimensional space. For instance, if we assume that the illustration has a scale of 0 to 100 starting from the origin point, the threshold region might be defined by the area encompassed between (0,0,0) and by lines/planes connecting (0, 0, 20), (0, 20, 0), (20, 0, 0). In some embodiments, the threshold region might be defined by a multi-dimensional function or by one or more different values for each dimension. In some embodiments, the threshold region 405 is used to filter out a vast majority of traffic corresponding to a combination of lower scoring dimensions (e.g. account, host, and service privilege scores). For instance, an email server will likely serve nearly every employee within an organization. Thus, a large amount of network traffic (or at least token/authorization requests/responses) for that organization will likely correspond to those email accesses. However, any single email inbox may not be considered a particularly valuable resource within an organization, particularly when compared to design documents, contracts, copyrighted material, unpublished material, etc. Thus, a threshold region 405 can be applied to filter out access activity corresponding to low value dimensional values.

FIG. 4B provides a graphical illustration of an example multi-dimensional graph having at least the dimensions of Fn through Fn+2 replaced with the service privilege score, the account privilege score, and the host privilege score in order to illustrate further aspects of a particular embodiment.

As illustrated in FIG. 4A, FIG. 4B includes a first group of scores 410, a second group of scores 420, a third group of scores 430, the new token/authorization request/response activity 440, and the threshold region 405. However, FIG. 4B also illustrates four regions corresponding to different types of undesirable activity.

For instance, the region at 450 corresponds to activity of a compromised jump system, where a relatively high value host and relatively low value account (as represented by the corresponding scores) is being used to access a relatively high value service. The region at 460 comprises insider activity where a relatively low value host and account (as represented by the corresponding scores) is being used to access a relatively high value service. The region at 470 comprises unusual administrator console activity where a relatively low value host and relatively high value account (as represented by the corresponding scores) is being used to access a relatively high value service. The region at 480 comprises high risk administrator account activity where a relatively low value host and relatively high value account (as represented by the corresponding scores) is being used to access a relatively low value service. In some embodiments, the regions boundaries move dynamically in relations to the regions identified as corresponding to normal behavior.

Furthermore, in some embodiments, the regions (450, 460, 470, 480) are used to determine the type of abnormal activity and the type of abnormal activity is included in the alert generated by the process.

In some embodiments, the new token/authorization request/response activity 440 falls within the insider region 460. Thus, the activity might be associated with an alert indicating potentially malicious insider activity.

Figure 5:
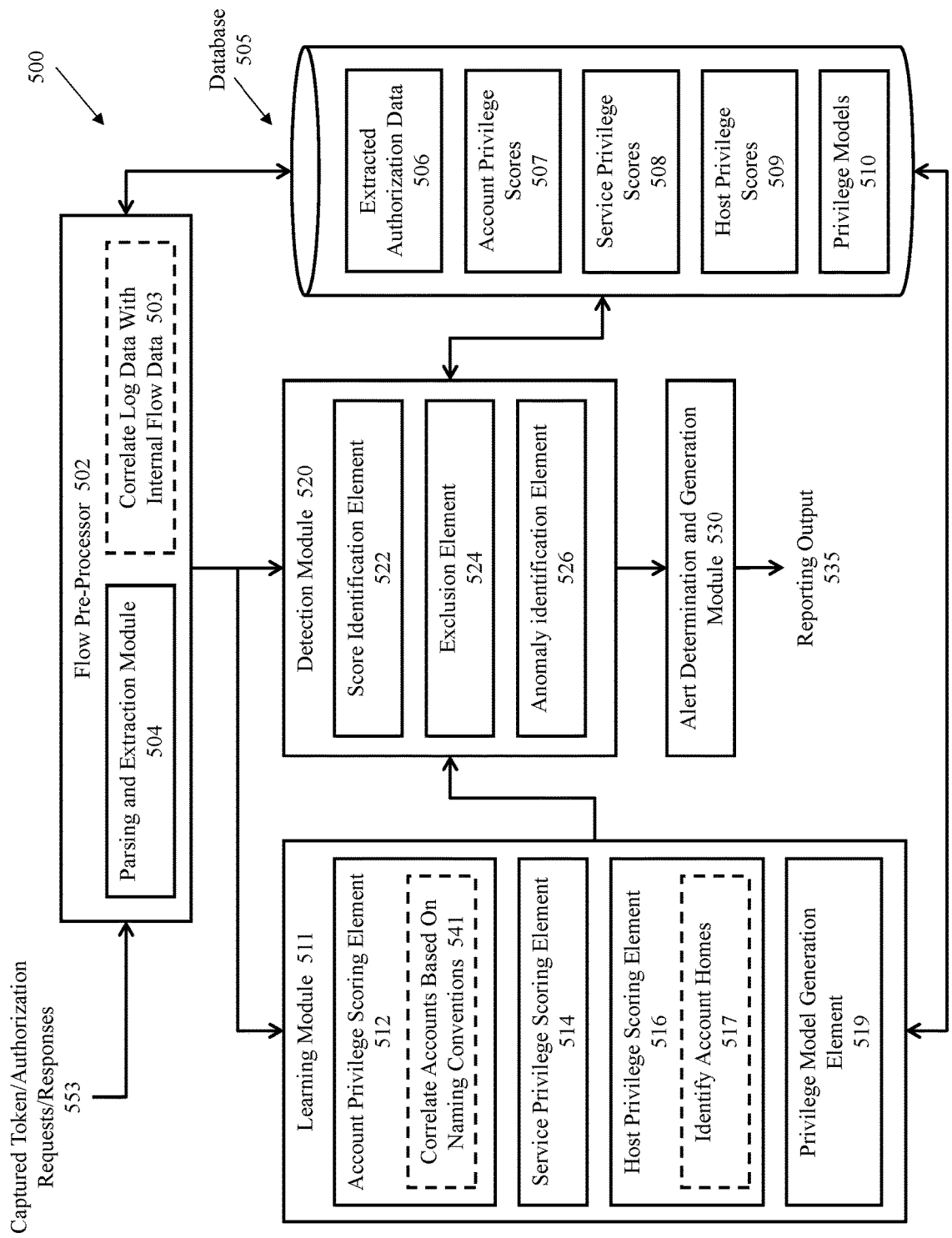
FIG. 5 illustrates a block diagram of at least some embodiments of the invention.

FIG. 5 illustrates a block diagram of at least some embodiments of the invention. For instance, the block diagram illustrates a learning module for generation of the models, a detection module for identifying potentially malicious activity, a flow pre-processor for ingesting data, and a database for use in storing and/or exchanging data between the elements.

The flow pre-processor 502 receives captured token/authorization requests/responses 533. In some embodiments, the data representing captured token/authorization requests/responses is captured by a sensing module as discussed above, whether part of or separate from detection engine 500. For instance, in some embodiments this comprises packet copy operation data captured in real-time from one or more switches (e.g. switch(es) 106) using one or more taps. In some embodiments, the captured token/authorization requests/responses 533 are processed at the location they are received, such as at the one or more switches (e.g. switch(es) 106) or at one or more hosts where the sensing module or elements of the detection engine are located. Regardless of how the corresponding data is captured, it is parsed using an extraction module 504, and optionally, with log data correlated with the internal flow data 503. In some embodiments, the results of the processing are stored in random access memory for local/future processing and/or in a database (e.g. database 505) in a portion for extracted authorization data 506. In some embodiments the flow pre-processor 502 is coupled to a learning module 511, a detection module 520, a database 505, or some combination thereof.

The parsing and extraction module 504 identifies one or more packets, and from those packets identifies at least the host (the requesting apparatus), the service being requested, and the account. For instance, the parsing and extraction module utilizes a database of mappings for identifying the above information from the packets sent from or received by the authentication service 122.

In some embodiments, a module for correlating log data with internal flow data 503 is provided. Here, the correlation module receives authentication service log data and processes the log(s) to identify token/authorization request/response data that was not identified via packet capture—e.g. by comparing logged data to a list/database of time stamped token/authorization request/response data stored in random access memory or in a non-volatile storage device (see e.g. extracted authorization data 506 in database 505). In some embodiments, 503 executes the process describe in regard to 305a.

In some embodiments, a learning module 511 includes an account privilege score element 512, a service privilege scoring element 514, a host privilege scoring element 516, and a privilege model generation element 519. In some embodiments, the leaning module accesses the database 505, a portion of random access memory shared with the flow pre-processor 502, or a local storage element (either volatile or non-volatile) to retrieve extracted authorization data. The extracted authorization data is then used to generate the account privilege scores 507, the service privilege scores 508, and the host privilege scores 509 as discussed in the embodiments above. Once the scores are generated the learning module 510 can generate any corresponding privilege models 510.

In some embodiments, the account privilege score element 512 processes the extracted authorization data as discussed above in regard to 306a to generate a plurality of account privilege scores. In some embodiments, the account privilege scoring element 512 includes an element for identifying/adjusting accounts scores (541) based on a determination that the account is a high value account due to a determination that the account follows a naming convention used for other corresponding high value and high privilege score accounts as discussed above regarding 307a.

In some embodiments, the service privilege scoring element 514 processes the account privilege score 507 from a shared non-volatile storage (e.g. database 505 having account privilege scores 507) or from a share volatile memory space. For instance, the service privilege scoring element retrieves/identifies the account privilege scores generated by the account privilege scoring element 512, parses the scores to determine the account privilege scores corresponding to each service to be scored, and generates a service privilege score therefrom—e.g. the service privilege score comprising the mean, median, mode, or sum of the weighted account privilege scores that have access to the service (see 308a discussion above). In some embodiments, the service privilege scores generated are stored in a shared non-volatile storage (e.g. database 505) in a portion identified for storing service privilege scores (e.g. service privilege scores 508).

In some embodiments, the host privilege scoring element 516 processes the account privilege score 507 from a shared non-volatile storage (e.g. database 505 having account privilege scores 507) or from a share volatile memory space. For instance, the service privilege scoring element retrieves/identifies the account privilege scores generated by the account privilege scoring element 512, and processes those scores to determine the host or hosts corresponding to those scores—e.g. each host privilege score comprises the mean, median, mode, or sum of the corresponding account privilege scores (see 310a discussion above). In some embodiments, the host privilege scores generated are stored in a shared non-volatile storage (e.g. database 505) in a portion identified for storing host privilege scores (e.g. host privilege scores 509).

In some embodiments, account homes can be identified based on more than mere use on a particular host (see 517). For instance, an account might be used at multiple hosts at different or even overlapping times—e.g. by an administrator or supervisor modifying some configuration information using their account on different machines. For example, an administrators account used on multiple machines might be identified as having an account home corresponding to a host on which the account is most frequently used during a corresponding training period. In some embodiments, if an account is used on multiple machines only a single host is identified as the home host, and only that host's privilege score accounts for the use of that account. In some embodiments, the account may be determined to be at home at multiple machines as determined by a usage threshold. For instance, a minimum threshold of 3 token/authorization requests for the same combination of account and service in a given time period is satisfied, then the account will be considered to be at home on that device. Alternatively, or in combination, accounts could be determined to be at home on a host if the account was used to access a minimum number of services in a given period. To illustrate, an account might be used on a laptop, a desktop, and a mobile device (e.g. cellular phone) all over a single time period. Thus, using one or more thresholds of one or more types, an account might be determined to be at home on multiple hosts (e.g. the laptop, desktop, and mobile device), and thus be used in computing the hosts scores of multiple hosts. Furthermore, account homes may be identified in any way discussed above in regard to 311*a*.

In some embodiments, the privilege model generation element 511 processes the results from the account privilege score element 512, the service privilege scoring element 514, and the host privilege scoring element 516. The privilege model generation element accesses the database 505 or a portion of random access memory shared with these elements to facilitate/generate the models thereof.

For example, the learning module 511 accesses the account privilege scores 507, the service privilege scores 508 and host privilege scores 509 to generate a three-dimensional model having account privilege scores along one axis, service privilege scores along a second axis, and host privilege scores along a third axis. The model could be thought of as a graph having multiple regions that correspond to normal or abnormal behavior as previously discussed. For example, scores for a given time period can be mapped to a graph having the three-dimensions (an X dimension corresponding to the account privilege scores and a Y dimension corresponding to the service privilege scores, and a Z dimension corresponding to the host privilege scores) to generate a dot plot. Subsequently, one or more lines or paths, regions, or areas can be used to define normal behavior based on the captured information.

Detection module 520 processes newly captured token/authorization requests/responses from the flow pre-processor 502. For instance, flow pre-processor 502 identifies newly captured token/authorization requests/responses and forwards them to the sensing module or notifies the sensing module of an update to the extracted authorization data (506) in database 505. The sensing module 520 executes a scoring identification element at 522 to determine the scores for the newly captured token/authorization requests/responses by matching the newly capture network activity to the data generated by the account privilege scoring element 512, service privilege scoring element 514, and host privilege scoring element 516. In some embodiments, an exclusion element 524 implements pre-processing to remove activity information that is below a given threshold from further processing (e.g. below a service privilege score threshold). An anomaly identification element 526 processes the newly captured token/authorization requests/responses by fitting the representation of the newly captured data as scores to the generated model(s), where based on where the representation fits, the network activity is identified as normal or abnormal as previously discussed.

The alert determination and generation module 530 processes the newly captured token/authorization requests/responses to identify data marked as potentially malicious. If potentially malicious data is identified, one or more alerts are issued—e.g. to a user interface, email, push notification, messaging application, text message, or other communications/transmission method. Additionally, the alert determination and generation module 530, can generate reports of past activity over a time period, such as the number and type of requests/responses at different levels of granularity and including at least, normal activity, anomalous activity (including information that identifies why the activity was anomalous).

Database 505, as illustrated, comprises a single database. However, database 505 may comprise any of individual disks, storage appliances, distributed storage, or any combination thereof. Furthermore, database 505 may comprise one or more separate storage elements separately or in any combination, storing the extracted authorization data 506, the account privilege scores 507, the service privilege scores 508, the host privilege scores 509 and the privilege models. Furthermore, the extracted authorization data 506, the account privilege scores 507, the service privilege scores 508, and the host privilege scores 509 may be stored individually or separately as files, or SQL database entries, or other tabular entries.

Therefore, what has been described is an improved approach for privileged account breach detections based on behavioral access patterns.

System Architecture Overview

Figure 6:
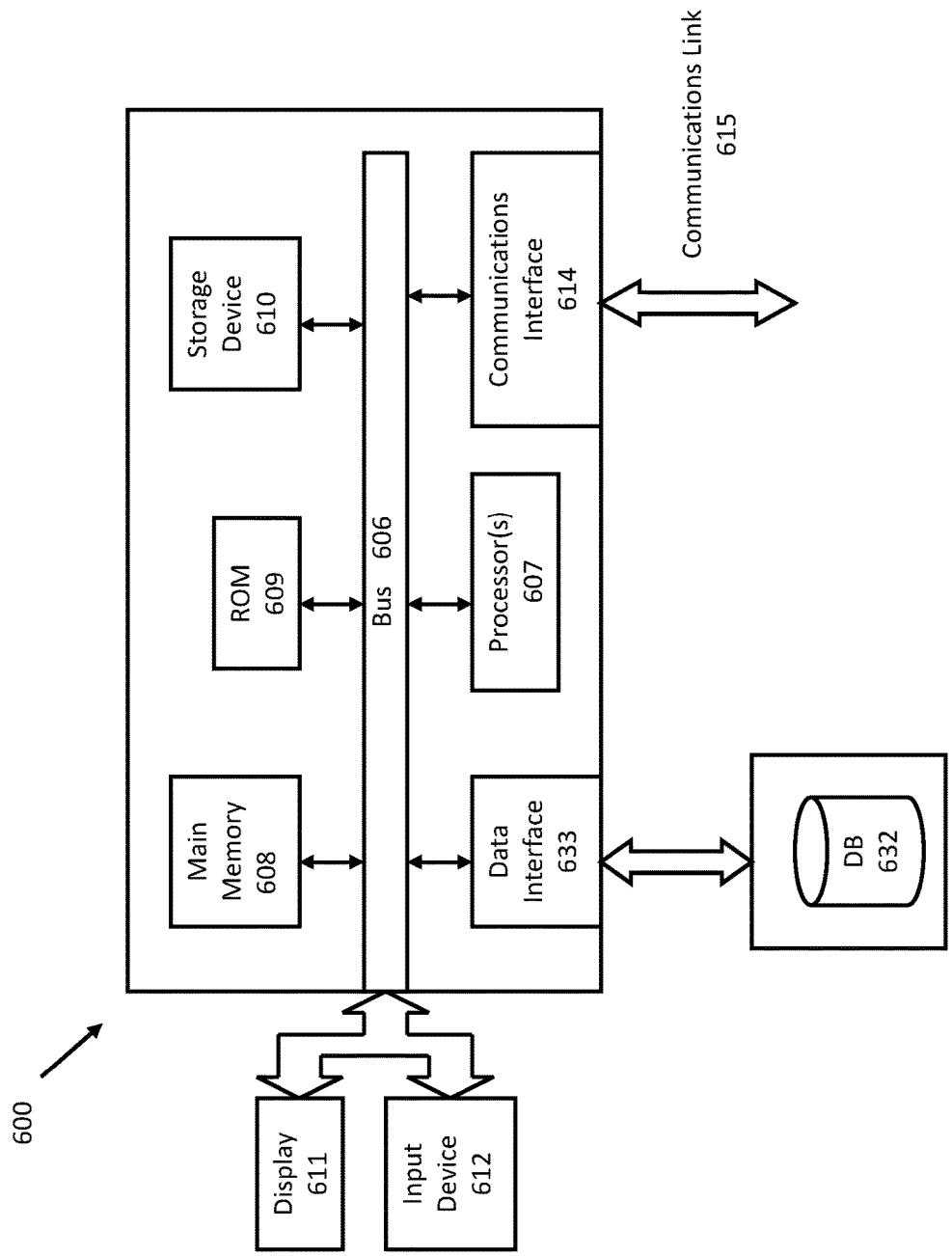
FIG. 6 is a block diagram of an illustrative computing system suitable for implementing an embodiment of the present invention.

FIG. 6 is a block diagram of an illustrative computing system 600 suitable for implementing an embodiment of the present invention. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media.

Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, e.g., application code, through communication link 615 and communication interface 614. Received program code may be executed by processor 607 as it is received, and/or stored in disk drive 610, or other non-volatile storage for later execution. Computer system 600 may communicate through a data interface 633 to a database 632 on an external storage device 631.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting potentially malicious activity on a network, comprising:
    generating a plurality of relative activity values from network activity, at least one relative activity value of the plurality of relative activity values comprising an account privilege score generated at least by:
        identifying a respective account used to access a first resource and a second resource,
        determining a first number of accounts that access the first resource,
        determining a second number of accounts that access the second resource, and
        setting the account privilege score for the respective account based on both the first number and the second number;
    generating a multi-dimensional relative activity model based on the plurality of relative activity values comprising at least the account privilege score;
    identifying additional network activity;
    generating additional relative activity values from the additional network activity, the additional relative activity values comprising at least an additional account privilege score; and
    determining whether the additional network activity corresponds to potentially malicious activity by fitting the additional relative activity values comprising at least the additional account privilege score to the multi-dimensional relative activity model.

2. The method of claim 1, wherein dimensions of the multi-dimensional relative activity model comprises at least two of the following dimensions: account privilege scores, service privilege scores, and host privilege scores.

3. The method of claim 1, wherein the multi-dimensional relative activity model maps relative activity values based on account privilege scores, service privilege scores, and host privilege scores.

4. The method of claim 3, wherein:
    the multi-dimensional relative activity model further defines at least two of the following regions: a normal region, an abnormal but not suggestive of malicious activity region and an abnormal and suggestive of malicious activity region; and
    the additional network activity is marked as normal, abnormal but not suggestive of malicious activity, or abnormal and suggestive of malicious activity based on the fitting of the additional relative activity values of the additional network activity to a corresponding region of the multi-dimensional relative activity model.

5. The method of claim 3, wherein an account value is determined to correspond to a high value account based on a naming convention.

6. The method of claim 1, wherein network activity comprises at least requests from hosts to an authentication service or responses from the authentication service to the hosts, requests comprising token or authorization requests, and responses comprising token or authorization responses.

7. The method of claim 1, wherein network activity is captured by at least one of: packet sniffing and authentication service log parsing.

8. The method of claim 1, wherein the multi-dimensional relative activity model is generated based on captured network activity over a predetermined time window.

9. The method of claim 8, wherein:
    the additional network activity is captured in real-time; and
    the relative activity values for the additional network activity are determined dynamically.

10. The method of claim 9, wherein the multi-dimensional relative activity model is regularly regenerated using a portion of the network activity and the additional network activity.

11. A non-transitory computer readable medium having stored thereon a sequence of instructions which, when executed by a processor, performs a set of acts for detecting potentially malicious activity on a network, comprising:
    generating a plurality of relative activity values from network activity, at least one relative activity value of the plurality of relative activity values comprising an account privilege score generated at least by:
        identifying a respective account used to access a first resource and a second resource,
        determining a first number of accounts that access the first resource,
        determining a second number of accounts that access the second resource, and
        setting the account privilege score for the respective account based on both the first number and the second number;
    generating a multi-dimensional relative activity model based on the plurality of relative activity values comprising at least the account privilege score;
    identifying additional network activity;
    generating additional relative activity values from the additional network activity, the additional relative activity values comprising at least an additional account privilege score; and determining whether the additional network activity corresponds to potentially malicious activity by fitting the additional relative activity values comprising at least the additional account privilege score to the multi-dimensional relative activity model.

12. The computer readable medium of claim 11, wherein dimensions of the multi-dimensional relative activity model comprises at least two of the following dimensions: account privilege scores, service privilege scores, and host privilege scores.

13. The computer readable medium of claim 11, wherein the multi-dimensional relative activity model maps relative activity values based on account privilege scores, service privilege scores, and host privilege scores.

14. The computer readable medium of claim 13, wherein:
the multi-dimensional relative activity model further defines at least two of the following regions: a normal region, an abnormal but not suggestive of malicious activity region and an abnormal and suggestive of malicious activity region; and
the additional network activity is marked as normal, abnormal but not suggestive of malicious activity, or abnormal and suggestive of malicious activity based on the fitting of the additional relative activity values of the additional network activity to a corresponding region of the multi-dimensional relative activity model.

15. The computer readable medium of claim 13, wherein an account value is determined to correspond to a high value account based on a naming convention.

16. The computer readable medium of claim 11, wherein network activity comprises at least requests from hosts to an authentication service or responses from the authentication service to the hosts, requests comprising token or authorization requests, and responses comprising token or authorization responses.

17. The computer readable medium of claim 11, wherein network activity is captured by at least one of: packet sniffing and authentication service log parsing.

18. The computer readable medium of claim 11, wherein the multi-dimensional relative activity model is generated based on captured network activity over a predetermined time window.

19. The computer readable medium of claim 18, wherein:
the additional network activity is captured in real-time; and
the relative activity values for the additional network activity are determined dynamically.

20. A system for detecting potentially malicious activity on a network, comprising:
a memory storing a sequence of program code instructions; and
a processor that executes the sequence of program code instructions to perform a set of acts, comprising:
generating a plurality of relative activity values from network activity, at least one relative activity value of the plurality of relative activity values comprising an account privilege score generated at least by:
identifying a respective account used to access a first resource and a second resource,
determining a first number of accounts that access the first resource,
determining a second number of accounts that access the second resource, and
setting the account privilege score for the respective account based on both the first number and the second number;
generating a multi-dimensional relative activity model based on the plurality of relative activity values comprising at least the account privilege score;
identifying additional network activity;
generating additional relative activity values from the additional network activity, the additional relative activity values comprising at least an additional account privilege score; and
determining whether the additional network activity corresponds to potentially malicious activity by fitting the additional relative activity values comprising at least the additional account privilege score to the multi-dimensional relative activity model.

* * * * *